(12) United States Patent
Ruppert et al.

(10) Patent No.: US 8,807,580 B2
(45) Date of Patent: Aug. 19, 2014

(54) AXLE ASSEMBLY FOR AGRICULTURAL APPLICATOR

(75) Inventors: Rex L. Ruppert, Benson, MN (US); Greg Fischer, Lake City, SD (US)

(73) Assignee: CNH Industrial America LLC, New Holland, PA (US)

( * ) Notice: Subject to any disclaimer, the term of this patent is extended or adjusted under 35 U.S.C. 154(b) by 281 days.

(21) Appl. No.: 13/226,993

(22) Filed: Sep. 7, 2011

(65) Prior Publication Data

US 2013/0056970 A1  Mar. 7, 2013

(51) Int. Cl.
*B60B 33/00* (2006.01)
*B62D 33/06* (2006.01)

(52) U.S. Cl.
USPC ............ 280/86; 280/62; 301/125; 301/126; 180/215

(58) Field of Classification Search
USPC ............ 280/86, 62; 180/215; 301/125, 126
See application file for complete search history.

(56) References Cited

U.S. PATENT DOCUMENTS

| | | | |
|---|---|---|---|
| 614,665 A | 11/1898 | Morris | |
| 708,466 A | 9/1902 | Davis | |
| 1,165,708 A | 12/1915 | Porter | |
| 1,662,622 A | 3/1928 | Walters et al. | |
| 1,899,347 A | 2/1933 | Mogford et al. | |
| 2,105,317 A | 1/1938 | Frank | |
| 2,544,387 A | 3/1951 | Kerr | |
| 3,059,942 A * | 10/1962 | Atwood et al. | 280/836 |
| 3,446,536 A | 5/1969 | Sutowski | |
| 3,701,464 A | 10/1972 | Puzik | |
| 3,946,824 A | 3/1976 | Jester et al. | |
| 4,077,351 A * | 3/1978 | Girona | 440/30 |
| 4,397,370 A | 8/1983 | Smith | |
| 4,589,460 A * | 5/1986 | Albee | 152/170 |
| 6,783,143 B1 | 8/2004 | Hung | |
| 7,021,722 B2 * | 4/2006 | Ruppert et al. | 303/2 |
| 7,093,319 B2 * | 8/2006 | Lemeur et al. | 16/44 |
| 7,195,266 B2 * | 3/2007 | Ricke et al. | 280/280 |
| 7,353,566 B2 * | 4/2008 | Scheiber et al. | 16/19 |
| 7,658,247 B2 * | 2/2010 | Carter | 180/65.24 |
| 8,413,295 B2 * | 4/2013 | Campbell | 16/35 D |
| 2003/0042787 A1 | 3/2003 | Dopico Varela | |
| 2006/0000397 A1 | 1/2006 | Ricke et al. | |
| 2006/0000654 A1 | 1/2006 | Ricke et al. | |
| 2011/0036671 A1 * | 2/2011 | McKay et al. | 188/69 |

FOREIGN PATENT DOCUMENTS

GB  530711  12/1940
JP  2008012962  1/2008

* cited by examiner

*Primary Examiner* — Kevin Hurley
(74) *Attorney, Agent, or Firm* — Rebecca L. Henkel

(57) ABSTRACT

A front axle assembly for a floater or other agricultural implement has a hollow shaft with pressed-in axle stubs for mounting the shaft to a pair of bearing assemblies. A pair of discs are mounted or otherwise secured to ends of the hollow shaft. The discs are angled inwardly from a position generally adjacent an inner end of the pressed-in axle stubs. The placement of the discs reduces stress applied to the hollow shaft during use.

18 Claims, 6 Drawing Sheets

AXLE ASSEMBLY FOR AGRICULTURAL APPLICATOR

BACKGROUND OF THE INVENTION

The present invention relates generally to agricultural applicators and, more particularly, to a front axle assembly for a three-wheel agricultural applicator.

Numerous types of agricultural applicators are available today. These can include a pull-type unit or a self-propelled unit. A certain known agricultural applicator is also referred to a "floater." The floater is a large vehicle that uses oversized floatation tires to carry the vehicle across firm to muddy agricultural environments. The floater has a chassis assembly configured to support one or more bulk storage tanks or bins of product for application in an agricultural environment, usually before planting in the spring or after harvest in the fall. The type of agricultural product e.g., fertilizer, herbicide, pesticide, nutrients, etc. can vary. The floater can also be utilized to tow various agricultural implements. The oversize-tired agricultural applicator is generally desired for its ability to maneuver heavy loads over extremely rough and difficult agricultural terrain with minimal soil compaction.

One particular floater has a pair of rear floatation tires and a single front and relatively oversized floatation tire. One of the drawbacks of such a three-wheel floater is the size, and thus weight, of the single front floatation tire and the axle to which it is mounted. The axle is typically a solid rod of steel, aluminum or other alloy and can thus be quite heavy. As consumers demand floaters with increased load capacity, the size of the floatation tires will also increase. Larger tires typically results in larger axles, and larger axles (together with the larger tires) yields a heavier machine. A heavier machine produces a number of challenges and potential drawbacks; namely, increased fuel consumption by the engine as more work is required to maneuver the machine.

Therefore, there is a need for a floater having a lighter front wheel assembly yet capable of handling an increased load capacity.

SUMMARY OF THE INVENTION

The present invention is directed to a front axle assembly for a floater or other agricultural implement. The front axle assembly has a hollow shaft with pressed-in axle stubs for mounting the shaft to a pair of bearing assemblies. A pair of discs are mounted or otherwise secured to ends of the hollow shaft. In one embodiment, the discs are angled inwardly from a position generally adjacent an inner end of the pressed-in axle stubs. The placement of the discs reduces stress applied to the hollow shaft during use.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION

Figure 1:
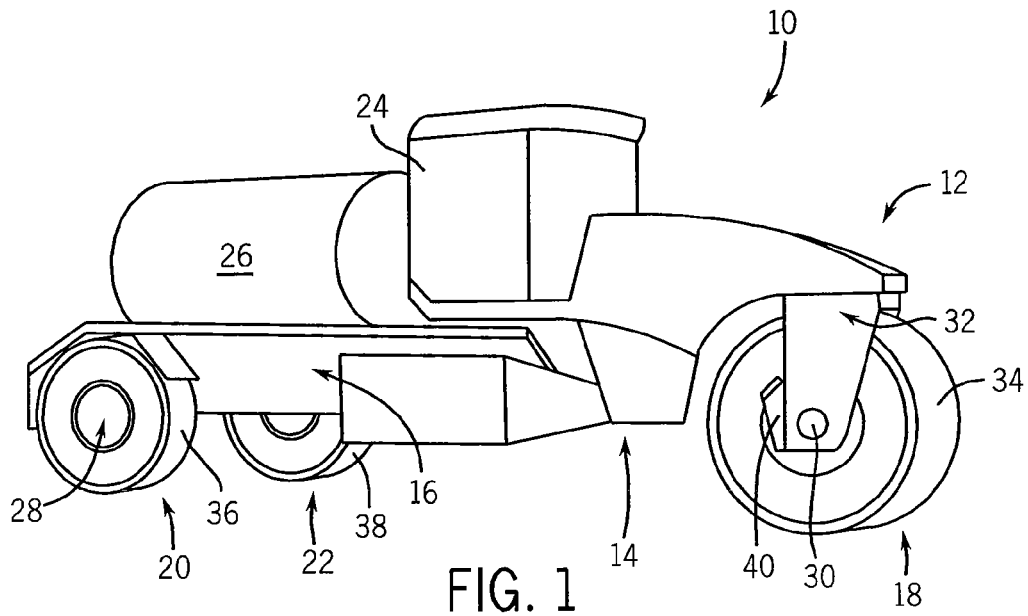
FIG. 1 is a pictorial view of an agricultural application system.

Referring to FIG. 1, an agricultural application system 10 includes an agricultural applicator, commonly referred to as a as a floater 12. The floater is a type of agricultural applicator commonly used to apply crop nutrients or animal or human waste (sludge) to soils, typically before planting in the spring and/or after harvest in the fall. The floater 12 generally includes a chassis assembly 14 having a frame 16 supported by a single front wheel assembly 18 and a pair of rear wheel assemblies 20, 22. The chassis assembly 14 supports a cab 24 and a bulk storage tank 26. The bulk storage tank 26 typically contains agricultural product such as liquid fertilizer or dry fertilizer for application in an agricultural environment.

FIG. 1 shows a preferred embodiment of the floater 12 with the chassis assembly 14 having a rear axle 28 mounted with the pair of rear wheel assemblies 20, 22, and a front axle or shaft 30 in support of the front wheel assembly 18. The particulars of the front axle 30 will be described more fully with respect to FIGS. 5-7. The frame 16 includes a front fork assembly 32 configured to mount the front shaft 30 and associated front wheel assembly 18. The front wheel assembly 18 typically is centrally mounted on the front shaft 30.

Each of the wheel assemblies 18, 20, 22 of the floater 12 employs respective oversized floatation tires 34, 36, 38, which are configured to carry the floater 12 across agricultural terrain that can vary from firm to soft, tilled, and sometimes muddy agricultural environments. The floatation tires are typically very wide and thus, in a preferred embodiment, the floater 12 does not include suspension for the front wheel assembly 18. Without front suspension, large dynamic loads associated with operation of the floater 12 are transmitted to the front fork assembly 32 and front shaft 30. These large dynamic loads (e.g., a floater 12 is known to carry loads up to 14,000 pound through rough terrain and/or mud) can cause deflection in the front shaft 12. To avoid debris from contaminating operation of the front wheel assembly 18, the front fork assembly 32 is configured to be as tight as possible and yet wide enough to let the mud pass and not build up. Reinforcement plates 40, 42 are coupled to the front fork assembly 32 to enhance the strength of the front fork assembly 32. Accordingly, the front fork assembly 32 is able to handle the dynamic forces associated with braking the floater 12 when fully-loaded or partially-loaded.

Figure 2:
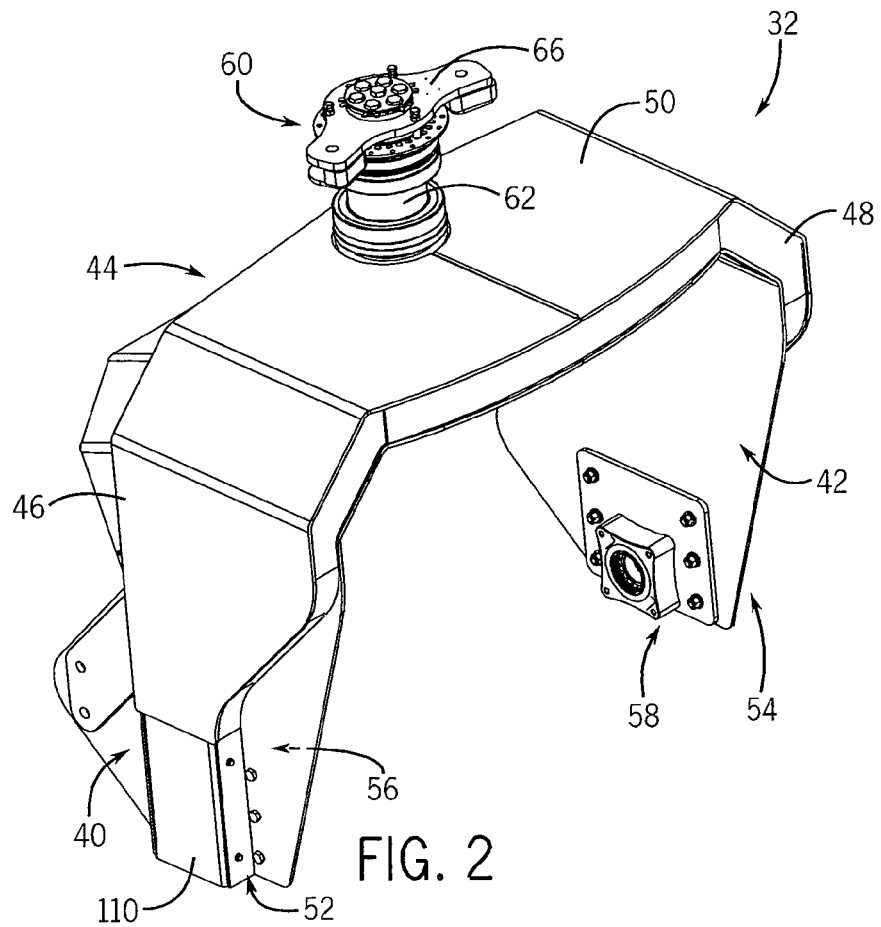
FIG. 2 is an isometric view of a front fork assembly of the agricultural application system of FIG. 1 according to the invention.

Turning now to FIG. 2, the front fork assembly 32 consists of a yoke 44 having a first yoke portion 46 and a second yoke portion 48 both of which extend in a generally perpendicular direction downward from an upper yoke portion 50. The free end 52 of the first yoke portion 46 and the free end 54 of the second yoke portion 48 mount on opposite ends (not shown) of the front axle 30 of the single front wheel assembly 18. The front tire 34 is mounted at a generally central position along the front axle 30 between the reinforcement plates 40, 42. As will be described, the ends of the front axle 30 are mounted to respective bearing assemblies 56, 58.

The upper yoke portion 50 supports a kingpin assembly 60. The kingpin assembly 60 includes a kingpin 62 fastened (e.g., welded, etc.) to the upper surface 64 of the upper yoke portion 50. The kingpin 62 is configured to rotatably couple the front fork assembly 32 and mounted front wheel assembly 18 to the frame assembly of the floater 12 as is known in the art. More particularly, the kingpin assembly 60 is coupled to a steering arm 66 that is configured to receive a well-known left-hand side steering actuator and a well-known right-hand side steering actuator (not shown) (e.g., hydraulic cylinder, pneumatic cylinder, etc.) in a known manner. The steering actuators are connected to a steering wheel in the cab 24 of the floater 12 in a known manner such that rotation of the steering wheel is operable to extend or retract the steering actuators so as to rotate the steering arm 66 with respect to a straight-forward direction of travel. Accordingly, the rotating steering arm 66 rotates the attached kingpin 62 and front fork assembly 32 about upper bearing assembly 68 to cause a desired turn angle of the floater 12.

Figure 3:
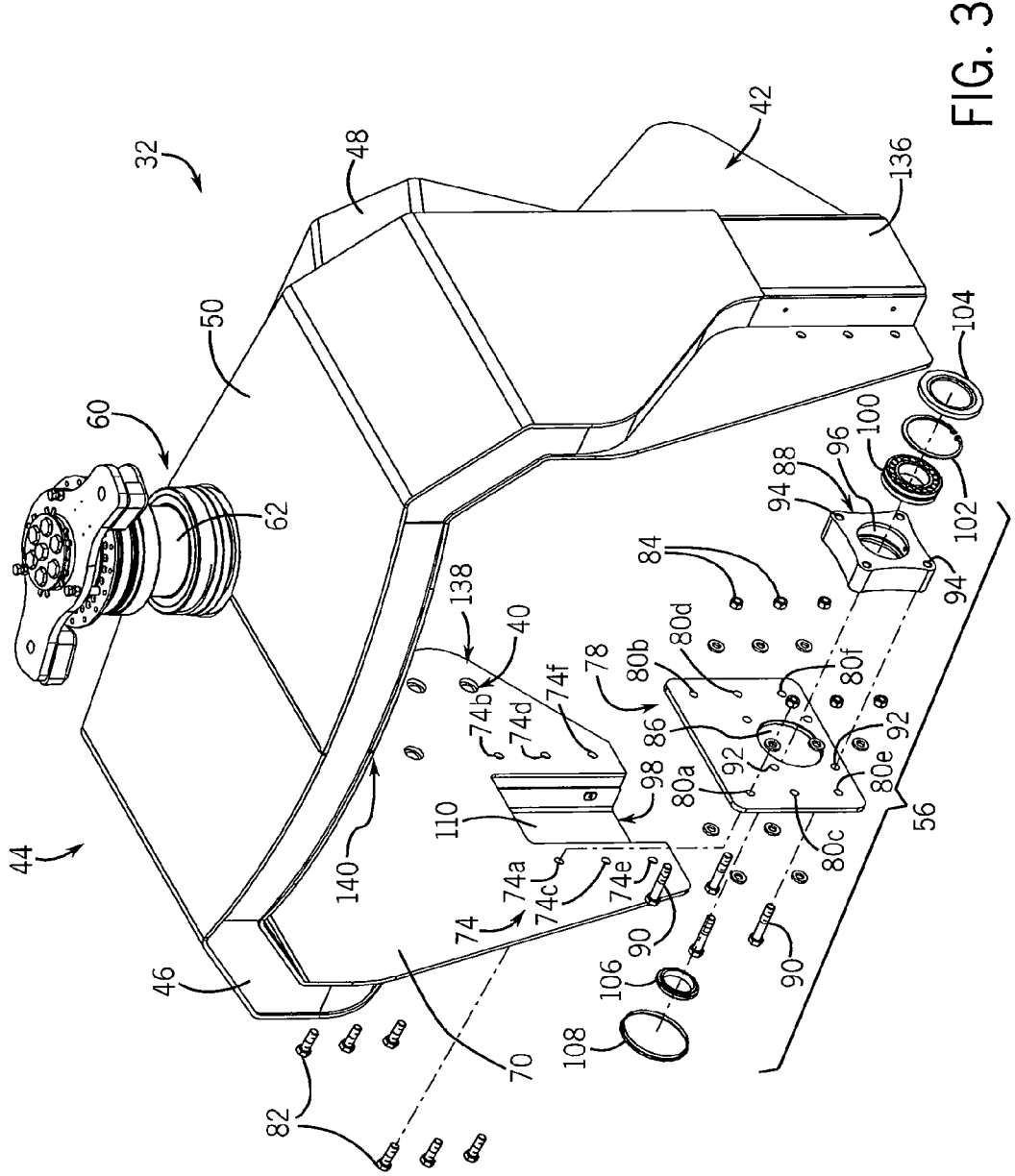
FIG. 3 is an exploded view of a left side of the front fork assembly.
Figure 4:
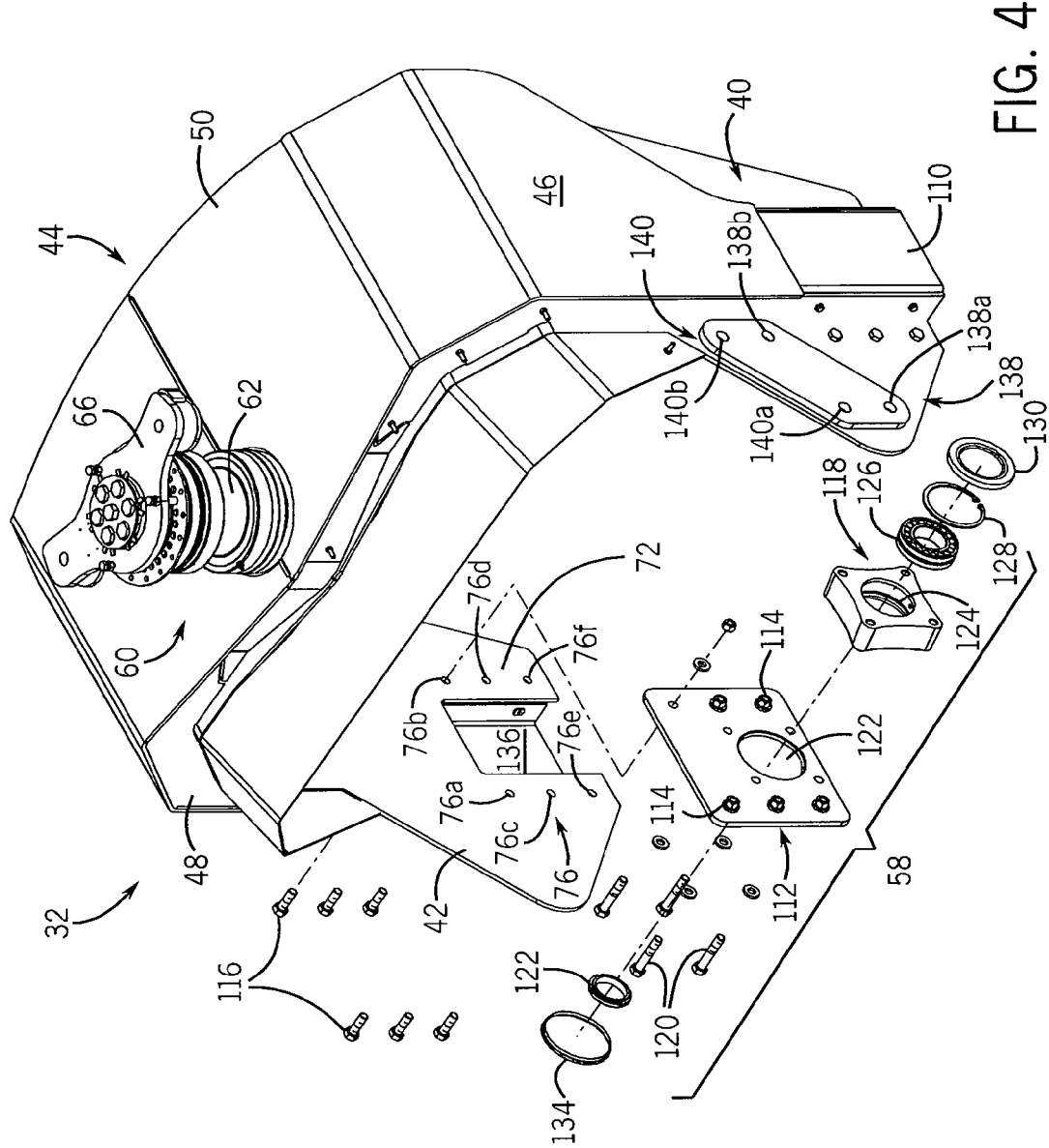
FIG. 4 is an exploded view of a right side of the front fork assembly.

Turning now to FIGS. 3 and 4, the front fork assembly 32 is designed to provide variable positioning of the front axle 30 to accommodate variability in the size of floatation tire used as part of the front wheel assembly 18. Generally, the larger the diameter of the floatation tire, the lower the mounting of the front axle 30 relative to the first yoke portion 46 and the second yoke portion 48, and vice-versa. Accordingly, the inner surface 70 of reinforcement plate 40 and the inner surface 72 of the reinforcement plate 42 each contain a respective sextet of mounting points 74, 76. The mounting points 74, 76 in the illustrated embodiment are holes machined or otherwise formed in inner surfaces of the yoke portions. In the illustrated embodiment, the twelve mounting points define two pairs of mounting positions for the floatation tire 34, e.g., an upper position defined by mounting points 74a-d, 76a-d and a lower position defined by mounting points 74c-f, 76c-f. However, it will be appreciated that that in either position, all the mounting points are used. That is, the smaller tire turns the plate 78 180 degrees (from that shown in the figures) so as to put the axle bearing in the upper position. The upper mounting position is used when mounting a 66×43-25 sized tire and the lower mounting position is used when mounting a 73×44-32 sized tire. Alternately, the upper mounting position could be used for mounting a 1000 (or 1050)/50R25 sized tire and the lower mounting position could be used for mounting a 1050/50R32 sized tire. It is understood however that the other sized tires could be used with the floater 12. Moreover, while the illustrated floater 12 has been described as having two separate mounting positions for the front floatation tire 34, it is understood that the inner surfaces of the first and second yoke portions could be constructed to have mounting points that define more than two mounting positions for the front floatation tire 34. Additionally, while in one preferred embodiment, two of the mounting points for each sextet are used for both the upper and lower mounting positions, it is contemplated that separate mounting points could be used. For instance, the first and second yoke portions could be configured to each have an octet of mounting points to define the upper and lower mounting positions. Similarly, to accommodate additional variability in the size of tires usable with the floater 12, the octet of mounting points could be arranged to define three different mounting positions.

As noted above, the front axle 30 mounts to the front fork assembly 32 via bearing assemblies 56, 58. FIG. 3 shows the composition of bearing assembly 56 which is used to mount the right end of the front axle 30 (as viewed from the operator cab) to reinforcement plate 40 at either one of the upper and lower mounting positions depending on the size of the floatation tire supported by the axle. FIG. 3, which will be described below, shows the composition of bearing assembly 58 which is used to mount the left end of the front axle 30 (as viewed from the operator cab) to reinforcement plate 42 at either one of the upper and lower mounting positions. It is highly preferred that both ends of the front axle 30 be mounted to matched mounting positions, i.e., either to both upper mounting positions or to both lower mounting positions. Mismatching the mounting positions could cause damage to the axle, the floatation tire, or the front fork assembly.

Bearing assembly 56 consists of a bearing cover plate 78 that has through-holes 80a-f that align with the mounting points 74a-f. The bearing cover plate 78 mounts to the reinforcement plate 40 by bolts 82 and nuts 84. An enlarged opening 86 is formed in the bearing cover plate 78 and is offset vertically from the center of the bearing cover plate 78. Thus, when using the lower mounting position, the bearing cover plate 78 is rotated to the position shown in FIG. 3 with the enlarged opening 86 oriented below the horizontal centerline of the bearing cover plate 78. When using the upper mounting position, the bearing cover plate 78 is rotated 180 degrees so that the enlarged opening 86 is above the centerline of the bearing cover plate 78. Regardless of position, the through-holes 80 align with the mounting points 74. Hence, the bearing cover plate 78 is effectively a universal mounting plate.

The bearing assembly 56 further consists of a bearing housing assembly 94 that mounts to the bearing cover plate 78 using bolts 90 through-holes 92. In this regard, the bearing cover plate 78 further has holes 92 that align with holes 94 formed in the periphery of the bearing housing 90. Once aligned, bolts 90 can be passed through the respective holes and tightened down to secure the bearing housing 88 to the bearing cover plate 78. Regardless of position, e.g., upper position or lower position, the bearing housing 88 has a central opening 96 that is co-aligned with the enlarged opening 86 of the bearing cover plate 78. Both openings communicate with a rectangular shaped pocket 98 formed in the lower end of reinforcement plate 40.

Bearing assembly 56 further includes a bearing roller 100, clip ring 102, and double lip seal 104 that are seated in the central opening 96. The right end of the front axle 30 is secured in the bearing assembly 56 by lug 106 and cap 108. A bearing cover guard 110 is preferably secured to the outer surface of the reinforcement plate 40 to cover the bearing assembly 56, as best shown in FIG. 2.

Turning now to FIG. 4, the left-side bearing assembly 58 has a component makeup like that of the aforedescribed right-side bearing assembly 56. In this regard, bearing assembly 58 consists of a bearing cover plate 112 that mounts to the second yoke portion 48 by nuts 114 and bolts 116. A bearing housing 118 mounts to the bearing cover plate 112 by bolts 120. The bearing cover plate 112 has an enlarged opening 122 that is aligned with a central opening 124 formed in bearing housing 118. A bearing roller 126, a clip ring 128, and a double lip seal 130 are seated in the central opening 124, and the left-side of the front axle 30 is secured in the bearing housing 118 by lug 122 and cap 134. A bearing cover guard 136 is secured to the outer surface of the reinforcement plate 42 to cover the bearing assembly 58.

In a preferred embodiment, the floater 12 has a front wheel braking system (not shown). An exemplary front wheel braking system is described in U.S. Pat. No. 7,021,722, the disclosure of which is incorporated herein. As described in the aforementioned patent, which is assigned to CNH America LLC, the assignee of the present application, the braking system includes a front brake mechanism comprising a caliper assembly in combination with a disc brake configured to apply a braking force to the front wheel assembly 18. As known in the art, a caliper assembly interfaces with a disc brake (not shown) to slow and stop rotation of the front wheel assembly 18. The disc brake is fixed to rotate with the floatation tire 34 and the front axle 30 mounted to the yoke 44, as described above. A conventional front fork assembly for a three-wheel floater provides a single mounting location for the caliper assembly and that position is preferably upward and to the rear relative to the front axle 30, preferably at approximately a 45-degree angle relative to the horizontal. For a conventional front fork assembly, the mounting position is matched to the size of the floatation tire. As such, if a different sized tire is used, the caliper assembly may not be mounted properly to effectively apply braking pressure to the disc brake.

Accordingly, the present invention provides a front fork assembly 32 that defines multiple mounting positions for a caliper assembly. Turning now to FIGS. 3 and 4, two pairs of caliper mounting points 138, 140 are defined on the inner surface of reinforcement plate 40. In the illustrated embodiment, the mounting points 138, 140 are holes formed in the inner surface of the reinforcement plate 40. The pairs of holes are raised and offset rearwardly from the horizontal axis of the front axle 30. In this regard, the inner (lower) radial holes 138a, 138b define a first mounting position that is to be used when the lower bearing mounting position is being used and outer (upper) radial holes 140a, 140b define a second mounting position that is to be used when the upper bearing mounting position is being used. The illustrated embodiment provides two different mounting positions for the caliper assembly, which coincides with the number of mounting positions for the bearing assemblies.

Figure 5:
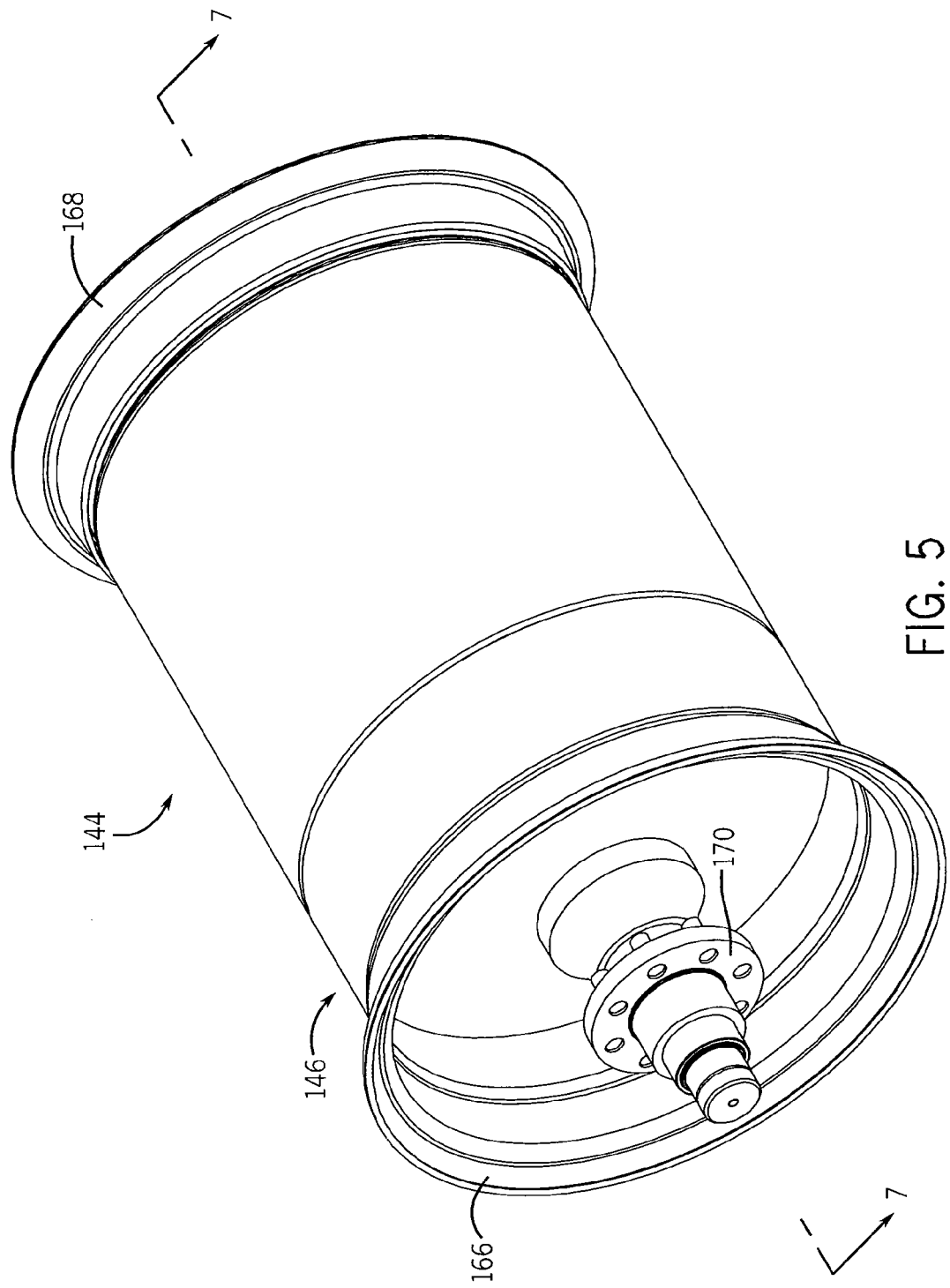
FIG. 5 is an isometric view of a front wheel axle assembly of the agricultural application system according to another aspect of the invention.
Figure 6:
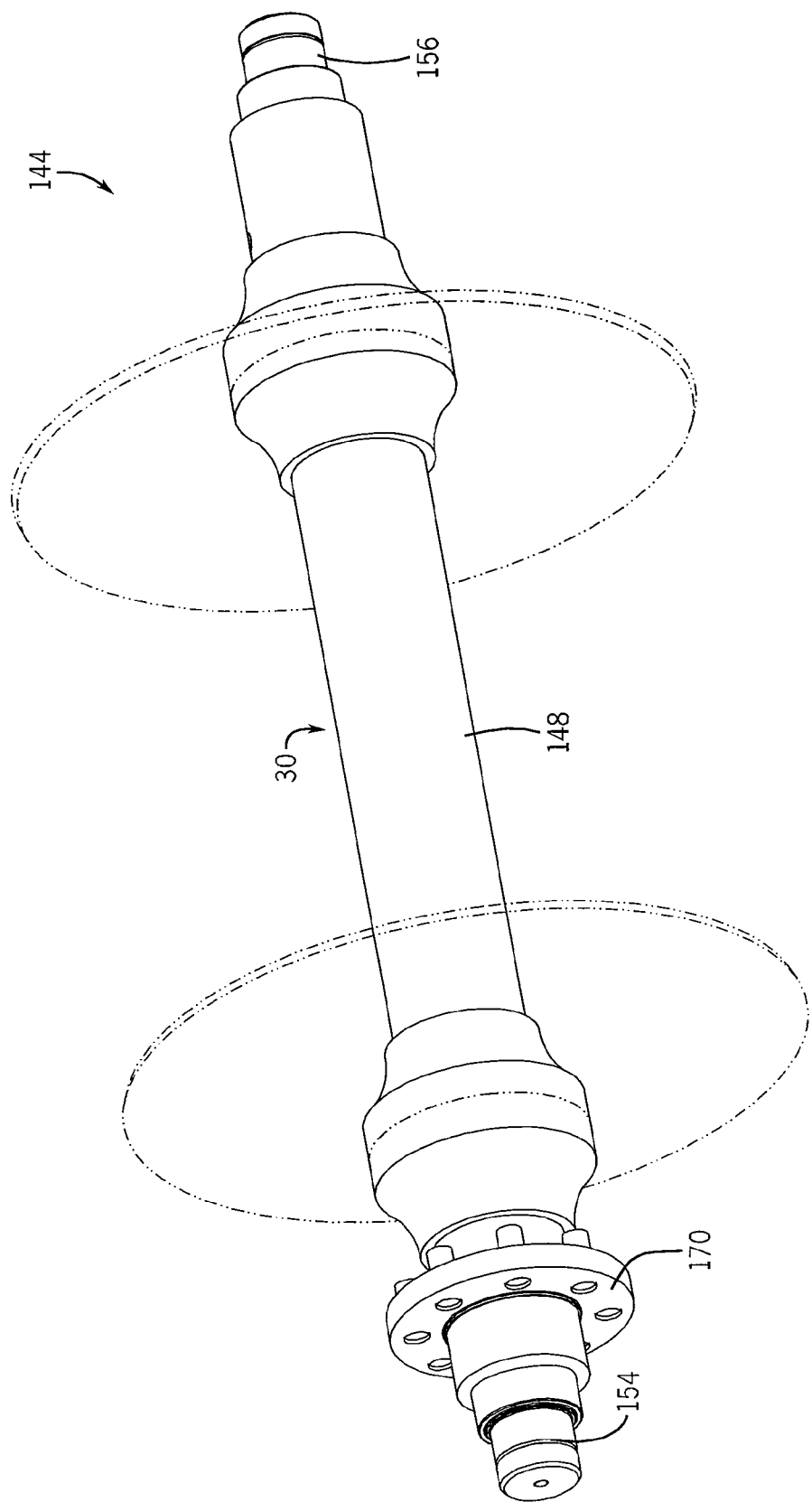
FIG. 6 is an isometric view of the front wheel assembly of FIG. 5 with an outer rim portion removed and disc portions shown in phantom.
Figure 7:
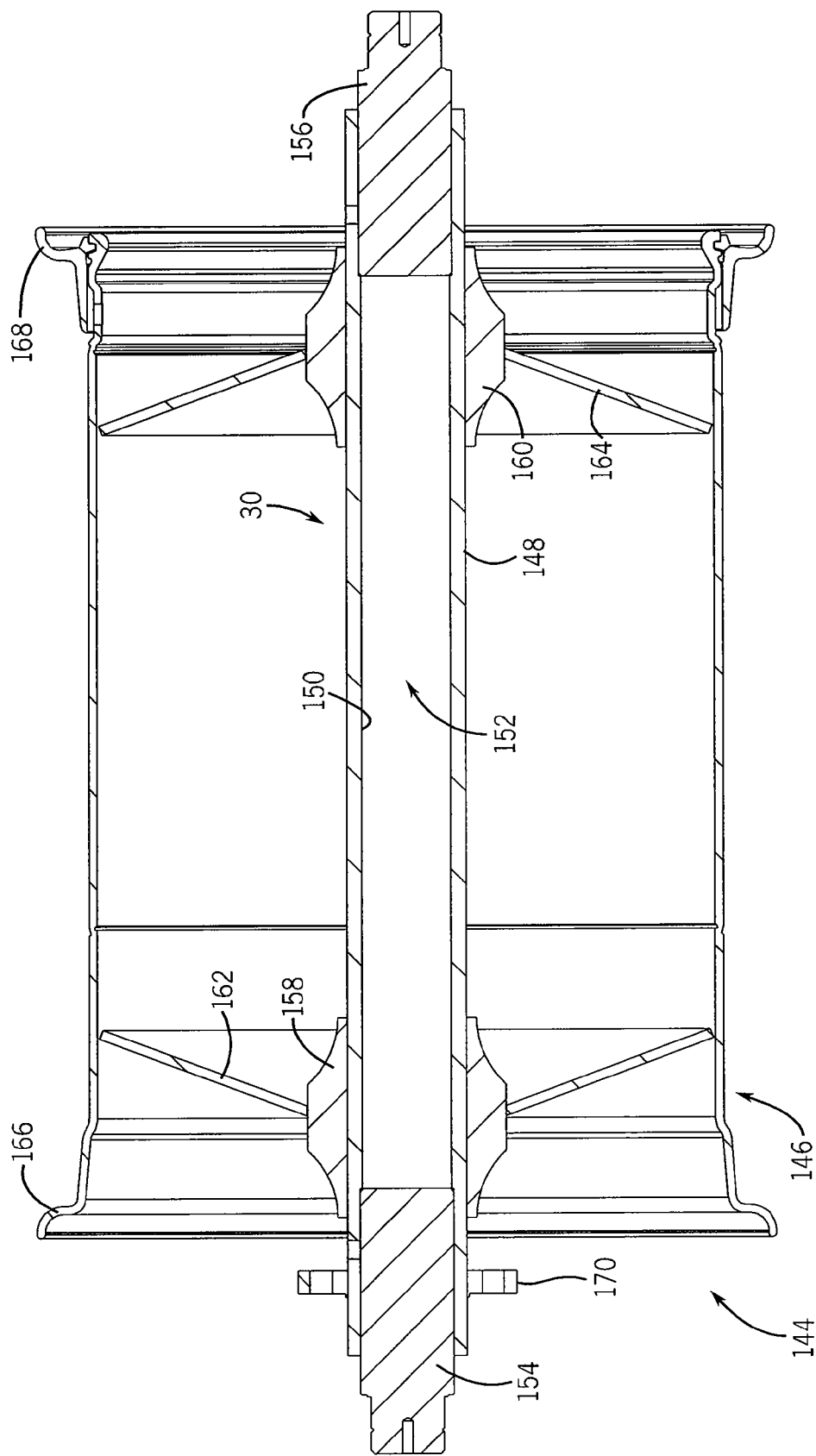
FIG. 7 is a section view of the front wheel axle assembly taken along line 7-7 of FIG. 5.

Turning now to FIGS. 5-7, the present invention provides a front axle assembly 144 that includes the aforementioned front axle or shaft 30 and rim 146 that is attached to the shaft 30. As known in the art, floatation tire 34 is mounted to the rim 146. As best shown in FIG. 7, in a preferred embodiment, the front axle or shaft 30 is hollow. The hollow shaft 30 has an outer annular wall 148 and an inner annular wall 150 that along its length defines a hollowed out center, shown generally defined at 152. Hallowing out the center of the axle provides a lighter axle and thus lighter front wheel assembly 18.

For mounting the shaft 30 to bearing assemblies 56, 58, the hollow shaft 30 includes a pair of pressed-in axle stubs 154, 156. As shown in FIG. 7, the outer diameter of the axle stubs is slightly more than the inner diameter of the shaft 30, which allows the stubs to be pressed into and held in the otherwise open ends (not numbered) of the hollow shaft. Conventional processes may be used to secure the stubs within the hollow shaft.

As best shown in FIGS. 6 and 7, a pair of annular collars 158, 160 are secured, e.g., welded, to the outer annular wall 148 of the shaft 30. (Collars may or may not be part of this assembly, as needed for the specific design and load to carry.) The collars are positioned generally toward the ends of the front axle or shaft 30 and thus will be generally adjacent the bearing assemblies when the front wheel assembly 18 is assembled. Attached to each collar 158, 160 is a disc 162, 164, respectively, that extends from their respective collar to the inner surface of the outer rim 146. Each disc is preferably a single unitary structure that is welded or otherwise attached to the collars. Attaching the discs to the axle near the ends of the axle and thus near the bearings reduces the stress applied to the axle shaft. In one embodiment, the axle shaft is 54.76 inches (1391 mm) long and the inner edge of the discs are attached to the axle shaft approximately 12.76 inches (29.24 mm) inboard of the outer ends.

In one embodiment, the discs have a slightly conical shape and are oriented to angle inwardly toward the center of the front axle assembly 144. This also reduces the stress applied to the axle shaft. The outer rim 146 or drum, as best shown in FIG. 7 and as known in the art, has a raised lip 166, 168 at each outer end to limit axial movement of the floatation tire once mounted onto the rim 146. In one preferred embodiment of the front axle assembly 144, lip 168 is attached to the rim 146 after the floatation tire is loaded onto the rim 146. After the tire is mounted, the lip 168 is fixedly attached in a known manner to the rim 146. As best shown in FIG. 7, the raised lips 166, 168, extend from the outer rim 146 so as to be outboard of the collars 158, 160. A disc brake mount 170 is mounted to the shaft 30 outboard of disc 162 for coupling a disc brake (not shown) to the axle shaft in a known manner.

Many changes and modifications could be made to the invention without departing from the spirit thereof. The scope of these changes will become apparent from the appended claims.

The invention claimed is:

1. A front fork assembly for use with a three-wheel agricultural floater, comprising:
   a yoke having an upper yoke portion, a first yoke portion and a second yoke portion extending downwardly from generally opposite ends of the upper yoke portion;
   a kingpin assembly attached to the upper yoke portion;
   a front wheel assembly rotatably mounted to the yoke, wherein the front wheel assembly includes a front axle having a hollow shaft and a floatation tire mounted to the front axle; wherein the front axle further includes first and second axle stubs mounted to opposite ends of the hollow shaft, the first and second axle stubs adapted for mounting the front axle to the yoke; wherein the front wheel assembly further includes a cylindrical rim mounted to an outer surface of the front axle and wherein the rim has an outer surface spaced from the front axle and wherein floatation tire is carried by the outer surface of the rim.

2. The front fork assembly of claim 1 wherein the first and second axle stubs are pressed-in mounted to the opposite ends of the hollow shaft.

3. The front fork assembly of claim 1 wherein the front wheel assembly includes a pair of collars mounted to the outer surface of the front axle and a pair of discs extending from the collars to an inner surface of the rim.

4. The front fork assembly of claim 3 wherein each disc is angled inwardly such that an axle-mounted portion of each disc is outboard of a rim-mounted portion of the disc.

5. A front fork assembly for use with a three-wheel agricultural floater, comprising:
   a yoke having an upper yoke portion, a first yoke portion and a second yoke portion extending downwardly from generally opposite ends of the upper yoke portion;
   a kingpin assembly attached to the upper yoke portion;

a front wheel assembly rotatably mounted to the yoke, wherein the front wheel assembly includes a front axle having a hollow shaft and a floatation tire mounted to the front axle;

a first plurality of axle mounting points formed on the first yoke portion;

a second plurality of axle mounting points formed on the second yoke portion;

a first axle mounting arrangement formed from selected mounting points of the first plurality and the second plurality of mounting points; and a second axle mounting arrangement, different from the first axle mounting arrangement, and formed from selected mounting points of the first plurality and the second plurality of mounting points.

6. The front fork assembly of claim 5 wherein the first plurality of axle mounting points includes three pairs of mounting points and the second plurality of axle mounting points includes three pairs of mounting points.

7. The front fork assembly of claim 6 wherein the three pairs of mounting points of the first yoke portion are aligned with the three pairs of mounting points of the second yoke portion.

8. The front fork assembly of claim 7 wherein one pair of the first plurality of axle mounting points and one pair of the second plurality of axle mounting points form part of both the first axle mounting arrangement and the second axle mounting arrangement.

9. The front fork assembly of claim 5 wherein the first axle mounting arrangement and the second axle mounting arrangement define first and second discrete positions to which the front axle may be rotatably mounted to the yoke.

10. The front fork assembly of claim 9 wherein the first axle mounting arrangement defines an upper wheel mounting position and the second axle mounting arrangement defines a lower wheel mounting position.

11. The front fork assembly of claim 5 further comprising a first pair of brake caliper mounting points on the first yoke portion and a second pair of brake caliper mounting points on the second yoke portion.

12. The front fork assembly of claim 5 further comprising a kingpin assembly mounted to the upper yoke portion.

13. An agricultural applicator comprising:

a chassis supported by a pair of rear floatation tires and a front floatation tire;

a operator cab and fluid tank mounted to the chassis;

a front fork assembly mounted to a forward end of the chassis; and a front axle to which the front rotation tire is mounted, and rotatably mounted to the front fork assembly, the front axle having a hollow shaft and a pair of pressed-in axle stubs for mounting the hollow shaft to the front fork assembly.

14. The agricultural applicator of claim 13 wherein the front fork assembly has a front axle mounting arrangement that defines a pair of discrete mounting positions for the front axle.

15. The agricultural applicator of claim 13 further including a cylindrical rim mounted to an outer surface of the front axle and wherein the rim has an outer surface spaced from the front axle and wherein the floatation tire is carried by the outer surface of the rim.

16. The front fork assembly of claim 15 further comprising a pair of collars mounted to the outer surface of the front axle and a pair of discs extending from the collars to an inner surface of the rim and wherein each disc is angled inwardly such that an axle-mounted portion of each disc is outboard of a rim-mounted portion of the disc.

17. The agricultural applicator of claim 13 wherein the front fork assembly includes:

a yoke having an upper yoke portion, a first yoke portion, and a second yoke portion extending downwardly from generally opposite ends of the upper yoke portion;

a first plurality of axle mounting points formed on the first yoke portion;

a second plurality of axle mounting points formed on the second yoke portion;

a first axle mounting arrangement formed from selected mounting points of the first plurality and the second plurality of axle mounting points; and a second axle mounting arrangement, different from the first axle mounting arrangement, and formed from selected mounting points of the first plurality and the second plurality of axle mounting points.

18. A agricultural applicator comprising:

a chassis supported by a pair of rear floatation tires and a front floatation tire;

a operator cab mounted to the chassis;

a front fork assembly mounted to a forward end of the chassis; and a front axle for supporting the front floatation tire, and rotatably mounted to the front fork assembly, wherein the front axle includes a hollow shaft having a pair of pressed-in solid axle stubs and a rim mounted to an outer surface by a pair of spaced apart, inwardly angled discs.

* * * * *